United States Patent Office 3,472,914
Patented Oct. 14, 1969

3,472,914
THERMOSET VINYL CHLORIDE COATINGS FROM A MIXTURE OF EPOXIDIZED ADDITION COPOLYMERS AND CARBOXYLATED ADDITION COPOLYMERS
Lowell R. Comstock, South Charleston, Donald E. Hardman, Winfield, and Julius J. Brezinski, St. Albans, W. Va., assignors to Union Carbide Corporation, a corporation of New York
No Drawing. Filed Feb. 3, 1967, Ser. No. 613,729
Int. Cl. C08g 45/04; C09d 3/48
U.S. Cl. 260—836                    15 Claims

ABSTRACT OF THE DISCLOSURE

Coatings are prepared by the reaction of a vinyl chloride/vinyl acetate/glycidyl methacrylate (or acrylate) terpolymer with a vinyl chloride/vinyl acetate/vinyl alcohol terpolymer, a vinyl chloride/vinyl acetate/acrylic acid terpolymer, a vinyl chloride/vinyl acetate/methacrylic acid terpolymer or a vinyl chloride/vinyl acetate/maleic acid terpolymer at elevated temperatures in the presence of a suitable catalyst.

---

This invention relates to thermoset vinyl coatings and more particularly to epoxy containing vinyl terpolymer reaction products of vinyl chloride, vinyl acetate, glycidyl methacrylate or acrylate with carboxyl or hydroxyl containing vinyl chloride resin terpolymers.

A continuing need exists for coating compositions which exhibit: (1) good adhesion to the substrates to which they are bonded, (2) high impact resistance so that they will not chip away when subjected to external impinging forces, (3) good solvent resistance in order that they be free from deterioration due to environmental solvent systems, and (4) retention of their original color, that is, no blackening during their application to the substrate or upon standing thereafter.

A coating composition suitable for meeting the above requirements has been found to comprise:

(1) About 90 to 10 parts by weight of an epoxy containing vinyl chloride terpolymer selected from the group consisting of a vinyl chloride/vinyl acetate/glycidyl methacrylate terpolymer and a vinyl chloride/vinyl acetate/glycidyl acrylate terpolymer (2) About 10 to 90 parts by weight of a vinyl chloride polymer comprising either a vinyl chloride/vinyl acetate/vinyl alcohol terpolymer, a carboxyl containing vinyl chloride terpolymer such as, vinyl chloride/vinyl acetate/acrylic acid terpolymer, a vinyl chloride/vinyl acetate/methacrylic acid terpolymer or a vinyl chloride/vinyl acetate/maleic acid terpolymer; and (3) From about 0.1 to 3.0 percent by weight of catalytic curing agent based on the total weight of polymers used.

When the above coating composition is uniformly coated on a suitable substrate by methods well known in the art and heated at a temperature of about 250° F. to 500° F. for about 1 to 30 minutes, a thermoset vinyl coating results which has excellent impact and solvent resistance, color retention and adhesion to the coated substrate.

The vinyl chloride/vinyl acetate/glycidyl methacrylate terpolymers contains a major amount, that is, more than about 50 percent by weight, of vinyl chloride and from about 1.0 to 30.0% by weight of glycidyl methacrylate. A preferred terpolymer contains about 75 to 85% vinyl chloride, 5 to 15% vinyl acetate, and 5 to 15% glycidyl methacrylate polymerized therein. Particularly preferred is a composition containing about 80 to 85% vinyl chloride, 8 to 12% vinyl acetate, and 8 to 12% glycidyl methacrylate polymerized therein. The inherent viscosities of these terpolymers determined on 0.2 g. samples in 100 ml. of cyclohexanone at 30° C. according to ASTM D-1243 is preferably about 0.2 to 0.5 although terpolymers having inherent viscosities above and below this range can be used if desired. These same preferences apply to vinyl chloride/vinyl acetate/glycidyl acrylate terpolymers as well.

The vinyl chloride/vinyl acetate/vinyl alcohol terpolymers of this invention contain at least 50% by weight of vinyl chloride polymerized therein. It is preferred to employ terpolymers containing about 75 to 85% vinyl chloride, 5 to 15% vinyl acetate, and 5 to 10% vinyl alcohol polymerized therein.

The vinyl chloride/vinyl acetate/maleic acid terpolymers of this invention contain at least 50% by weight of vinyl chloride polymerized therein. It is preferred to employ terpolymers containing about 75 to 85% vinyl chloride 5 to 15% vinyl acetate, and 1 to 5% maleic acid polymerized therein.

The compositions of monomers in the vinyl chloride/vinyl acetate/acrylic or methacrylic acid terpolymers correspond to those cited above for the vinyl chloride/vinyl acetate/maleic acid terpolymers.

In order to facilitate the blending of the terpolymers together and also to facilitate application of the terpolymer mixtures to the selected substrate, it is preferred to dissolve them in a solvent or solvent mixture. Thus for example, aliphatic ketones such as methylisobutyl ketone, acetone, methylethyl ketone, isophorone, and the like can be employed. Although aliphatic ketones are preferred for preparing solutions with a high solids content (based on the weight of the polymer) other solvents can be used which include: carbonates such as propylene carbonate; nitroalkanes such as nitroethane; halogenated aromatic compounds such as ortho dichlorobenzene, alpha bromonaphthalene and the like; and glycol ethers such as methyl Cellosolve (trademark for monomethyl ethylene glycol) and the like. Any of the above mentioned solvents can also be used in conjunction with aromatic hydrocarbons such as benzene, toluene, xylene, and the like. A preferred solvent mixture comprises about 25 to 75 percent methylisobutyl ketone mixed with about 75 to 25 percent of toluene.

Among the catalytic curing agents which can be used in the practice of the invention are amine-borate complexes such as triethanol amine borate and the like; boron trifluoride amine complexes such as boron trifluoride-monoethylamine, boron trifluoride diethylamine, boron trifluoride-piperidene and the like; amine salts such as tri-(2-ethylhexoic) acid salts of tridimethylamine methyl phenol and the like; amines such as benzyldimethylamine and the like; inorganic bases such as sodium hydroxide, potassium hydroxide and the like; organic acids such as maleic acid and the like; inorganic acids such as phosphoric acid and the like; organotin compounds such as stannous octoate and the like; titanates such as tetrabutyl titanate and the like; uranyl salts such as uranyl nitrite and the like; and uranyl esters such as uranyl butyrate and the like. The boron trifluoride-amine complexes are the preferred catalytic agents used in this invention with boron trifluoride-monoethylamine catalyst being particularly preferred.

Although the catalyst concentration can extend from about 0.1 to 3 percent by weight based on the weight of the total polymer mixture, it is preferred to use a range of about 0.5 to 1.5 percent by weight.

Although a curing temperature range of about 250° F. to 500° F. can be used, it is preferred to use a range of about 300° F. to 400° F. with a range of about 300° F. to 350° F. being particularly preferred.

Although the curing time at the above stated temperature range can extend from about 1 to 30 minutes, it is preferred to use a curing time of about 10 to 20 minutes.

Although a range of about 90:10 percent by weight of vinyl chloride/vinyl acetate/vinyl alcohol or carboxyl containing vinyl chloride terpolymer can be used with about 10:90 percent by weight based on the total resin mixture of a vinyl chloride/vinyl acetate/gylcidyl methacrylate or acrylate terpolymer, it is preferred to use a ratio of about 60 percent of one of the former resins to about 40 percent by weight of the latter resins.

It will be readily understood by those skilled in the art that various materials such as heat stabilizers, colorants, fillers, plasticizers, and the like can also be employed in the compositions of this invention if desired. One advantage in using a heat stabilizer, such as a tin mercaptide and the like, lies in the fact that it permits the curing time to be increased to about 60 minutes if such an extension is desired.

Another advantage of the compositions of this invention resides in the good room temperature shelf-life. Thus, for example, it was observed that a solution consisting of toluene-methylisobutyl ketone mixture (50:50 by weight) in which is dissolved equal parts of a vinyl chloride/vinyl acetate/glycidyl methacrylate terpolymer and a vinyl chloride/vinyl acetate/vinyl alcohol terpolymer (solids content of 25% by weight together with 1.0% boron trifluoride-monoethylamine catalyst) was found to undergo only a slight increase in viscosity after 28 days storage at room temperature over that of the viscosity of the solution when originally mixed, that is, a viscosity increase from 430 to 500 centipoises. Similarly, no change in the properties of the cured coated resin was found after aging the solution for 28 days at room temperature.

The relative solvent resistance of the cured coatings was rated by placing a one-half inch diameter spot of methylisobutyl ketone on the cured coated panel, then testing for solvent attack with a sharp probe. Resistance to solvent attack was rated visually after two minutes contact with the solvent. A value of 10 was assigned to coatings undergoing no solvent attack and a value of 0 to those coatings showing complete disintegration under the influence of the solvent. The color of the cured coating was determined visually with a value of 10 being ascribed to no color formation and a value of 0 to coatings which had completely blackened. Impact resistance was determined with a Gardner "Coverall" Mandrel Impact Tester. The knife adhesion was determined by removing a portion of the coating from the substrate with a sharp knife. The relative adhesion ratings of good, fair and poor were assigned depending on the ease with which the coating is removed.

The coating compositions of this invention are applicable to a wide variety of substrates including but not limited to metals such as Bonderite steel, electrolytic tin plate, Bonderite aluminum and the like and cellulosic materials such as plywood, paper products, pressed wood, fiber-board and the like.

The invention is further described by the examples which follow, in which all parts and percentages are by weight unless otherwise specified.

EXAMPLE 1

A 30 percent by weight solution of a vinyl chloride/vinyl acetate/glycidyl methacrylate terpolymer (80.2%; 10.8%; 9.0; inherent viscosity of 0.296; 0.2 g. sample in 100 ml. of cyclohexanone at 30° C.) in toluene/methylisobutyl ketone (50/50 by weight) was mixed with a 30 percent by weight solution of a vinyl chloride/vinyle acetate/vinyl alcohol terpolymer (90.0%; 4.4%; 5.6%; inherent viscosity of 0.44; 0.2 g. sample in 100 ml. of cyclohezanone at 30° C.) in toluene/methylisobutyl ketone (50/50 by weight) and then blended with boron trifluoride monoethylamine catalyst in an amount sufficient to give a 1 percent by weight concentration of the catalyst based on the combined resin weight. The resultant solution prepared in conventional mixing equipment was cast on test panels of Bonderite steel, Bonderite aluminum, or electrolytic tin plate (¼") and allowed to air dry for 30 minutes after which these coated substrates were baked for about 15 minutes at 325° C. All of the coated and baked panels were found to have an impact resistance of greater than 320 inch-pounds, a solvent resistance value of 10, a visual color rating of 8, and good knife adhesion.

Control A

The procedure described in Example 1 was followed with the exception that no boron trifluoride monoethylamine catalyst was employed in the mixture. The coated baked test panels were found to have an impact resistance of about 5 in.-lbs., a solvent resistance of 0, a visual color rating of 9, and good knife adhesion.

Control B

The procedure described in Example 1 was followed with the exception that only the vinyl chloride/vinyl acetate/glycidyl methacrylate terpolymer was used in the coating formulation. This formulation lacking the vinyl chloride/vinyl acetate/vinyl alcohol terpolymer was found to afford coated panels having an impact resistance of about 5 in.-lbs., a solvent resistance of 0, a visual color rating of about 9, and good knife adhesion.

Control C

The procedure described in Example 1 was repeated with the exception that only the vinyl chloride/vinyl acetate/vinyl alcohol terpolymer was used in the coating formation. This formulation lacking the vinyl chloride/vinyl acetate/glycidyl methacrylate terpolymer afforded coated panels having impact resistance of about 5 in.-lbs., a solvent resistance of 0, a visual color rating of about 8 and good knife adhesion.

EXAMPLES 2–7

The procedure described in Example 1 was followed using varying ratios of vinyl resins. The ratios of vinyl chloride/vinyl acetate/glycidyl methacrylate terpolymer to vinyl chloride/vinyl acetate/vinyl alcohol terpolymer were 90:10, 75:25, 60:40, 50:50, 40:60, and 25:75. In each example, 1 percent by weight (based on the total weight of the resin) of boron trifluoride-monoethylamine catalyst was used. Two mil thick coatings were obtained by baking the respective formulations on Bonderite steel test panels for about 15 minutes at 325° C. The physical properties of the coated test panels are presented in Table I.

TABLE I

| Physical properties | Examples | | | | | |
|---|---|---|---|---|---|---|
| | 2 | 3 | 4 | 5 | 6 | 7 |
| Impact resistance [1] | 320 | 320 | 320 | 320 | 320 | 320 |
| Solvent resistance [2] | 10 | 10 | 10 | 10 | 10 | 10 |
| Color [3] | 9 | 9− | 8+ | 7 | 5 | 3 |
| Adhesion | Good | Good | Good | Good | Good | Good |

[1] 2.0 mil coatings on Bonderite steel; values in in.-lbs.
[2] Solvent resistance. 2.0 min. MIBK spot test; 10=no solvent attack.
[3] Color, visual: 10=no Color; 0=black.

EXAMPLES 8–13

When a vinyl chloride/vinyl acetate/vinyl alcohol terpolymer (90.0:3.9:6.1) having an inherent viscosity of 0.56 in cyclohexanone at 30° C. was substituted for the vinyl chloride/vinyl acetate/vinyl alcohol terpolymer described above, comparable physical properties were obtained with the baked test panels.

EXAMPLE 14

50 parts each of a vinyl chloride/vinyl acetate/glycidyl methacrylate terpolymer (described in Example 1) and 50 parts of a vinyl chloride/vinyl acetate/maleic acid terpolymer (77.8%:19.7:2.5 inherent viscosity of 0.287 in cyclohexane at 30° C.) were dissolved in a 50:50 (by weight) toluene-methylisobutyl ketone mixture sufficient to afford a 30 percent solution of resin by weight. Then 1 percent by weight (based on the total weight of resin) of boron trifluoride-monoethylamine catalyst was added to the solution. This mixture was thoroughly agitated to obtain a uniform solution which was then coated on Bonderite 37 steel test panels to a thickness of 2 mils. The coated test panels were cured at 300° F. for 15 minutes and the physical properties of the coated panels measured. The impact resistance was greater than 320 in.-lbs., the solvent resistance was 5, the knife adhesion was good and the visual color rating was 7.

EXAMPLE 15

The procedure of Example 14 was repeated with the exception that 0.5% (based on the total weight of resin) of stannous octoate was employed as the curing catalyst in place of the boron trifluoride-monoethylamine. The physical properties of the coated panels were as follows: impact resistance greater than 320 in.-lbs., solvent resistance 8, knife adhesion good and visual color rating 9+.

EXAMPLE 16

Fifty parts of a vinyl chloride/vinyl acetate/glycidyl methacrylate terpolymer (80.2%; 10.8%; 9.0% inherent viscosity=0.296 in cyclohexanone at 30° C.) and fifty parts of a vinyl chloride/vinyl acetate/maleic acid terpolymer (83.0:16.0:1.0 ratio inherent viscosity=0.287 in cyclohexanone at 30° C.) were dissolved in sufficient 50–50 (by weight) toluene-methylisobutyl ketone to afford a 30 percent solution by weight of resin. 0.5 percent by weight (based on the total weight of resin) of stannous octoate catalyst was then added to the solution and admixed thoroughly therein. Bonderite steel test panels were coated with this mixture and cured at 300° F. for 10 minutes. The physical properties of the cured test panels were as follows: impact resistance of 320 in.-lbs., solvent resistance of 5, knife adhesion good and visual color rating 9.

Control D

The procedure described in Example 14 was repeated with the exception that no vinyl chloride/vinyl acetate/maleic acid terpolymer was used. The physical properties of the cured Bonderite test panels were as follows: impact resistance of about 5 in.-lbs., solvent resistance 0, knife adhesion good and visual color rating 0.

Control E

The procedure described in Example 16 was repeated with the exception that the vinyl chloride/vinyl acetate/maleic acid terpolymer was omitted. The physical properties of the cured test panels were as follows: impact resistance 5 in.-lbs., solvent resistance 0, knife adhesion good and visual color rating 0.

EXAMPLE 17

The test panels prepared as in Example 1 were further evaluated for the effect of aging of the coating solutions on the properties of the coatings. Examination of the coatings prepared from coating solutions aged 7 days, 14 days, and 28 days respectively in each case showed no change from the original values reported in Example 1.

EXAMPLES 18–19

When the test panels are prepared as in Example 4 using vinyl chloride/vinyl acetate/acrylic acid terpolymers or vinyl chloride/vinyl acetate/methacrylic acid terpolymers in place of the vinyl chloride/vinyl acetate/maleic acid terpolymer comparable physical properties are obtained.

EXAMPLE 20

When test panels are prepared as in Example 1 using vinyl chloride/vinyl acetate/glycidyl acrylate terpolymer in place of the vinyl chloride/vinyl acetate/glycidyl methacrylate terpolymer comparable physical properties are obtained.

Although the invention has been described in its preferred forms with a certain degree of particularity, it is understood that the present disclosure has been made only by way of example, and that numerous changes can be made without departing from the spirit and scope of the invention.

What is claimed is:
1. A coating composition comprising:
   (a) about 90 to 10 parts by weight of an epoxy containing vinyl chloride terpolymer selected from the group consisting of vinyl chloride/vinyl acetate/glycidyl acrylate terpolymer containing at least 50% by weight of vinyl chloride, 5 to 15% by weight of vinyl acetate and 5 to 15% by weight of glycidyl acrylate copolymerized therein and a vinyl chloride/vinyl acetate/glycidyl methacrylate terpolymer containing at least 50% by weight of vinyl chloride, 5 to 15% by weight of vinyl acetate and 5 to 15% by weight of glycidyl methacrylate copolymerized therein,
   (b) about 10 to 90 parts by weight of a vinyl chloride terpolymer selected from the group consisting of terpolymers containing at least 50% by weight of vinyl chloride, 5 to 15% by weight of vinyl acetate and 5 to 10% by weight of vinyl alcohol copolymerized therein, terpolymers containing at least 50% by weight of vinyl chloride, 5 to 20% by weight of vinyl acetate and 1 to 5% by weight of acrylic acid copolymerized therein, terpolymers containing at least 50% by weight of vinyl chloride, 5 to 20% by weight of vinyl acetate and 1 to 5% by weight of methacrylic acid copolymerized therein and terpolymers containing at least 50% by weight of vinyl chloride, 5 to 20% by weight of vinyl acetate and 1 to 5% by weight of maleic acid copolymerized therein; and
   (c) from about 0.1 to 3.0% of a catalytic curing agent based on the total polymer weight.
2. The composition claimed in claim 1 wherein the epoxy containing vinyl chloride terpolymer is a vinyl chloride/vinyl acetate/glycidyl methacrylate terpolymer and the proportion of monomers is about 80:11:9.
3. The composition claimed in claim 1 wherein the vinyl chloride terpolymer is a vinyl chloride/vinyl acetate/maleic acid terpolymer and the proportion of monomers is about 83:16:1.
4. The composition claimed in claim 1 wherein the vinyl chloride terpolymer is a vinyl chloride/vinyl acetate/maleic acid terpolymer and the proportion of monomers is about 78:20:2.
5. The composition claimed in claim 1 wherein the catalytic curing agent is a boron trifluoride amine complex.
6. The composition claimed in claim 5 wherein the boron trifluoride amine complex is boron trifluoride monoethylamine.
7. The composition claimed in claim 1 wherein the catalytic curing agent is an organotin compound.
8. The composition claimed in claim 7 wherein the organotin compound is stannous octoate.
9. The composition claimed in claim 1 containing about 60 to 40 parts by weight of a vinyl chloride/vinyl acetate/glycidyl methacrylate terpolymer and about 40 to 60 parts by weight of a vinyl chloride/vinyl acetate/vinyl alcohol terpolymer.
10. The composition claimed in claim 1 containing about 60 to 40 parts by weight of a vinyl chloride/vinyl acetate/glycidyl methacrylate terpolymer and about 40 to

60 parts by weight of a vinyl chloride/vinyl acetate/ maleic acid terpolymer.

11. Method of preparing coated articles which comprises:
 (a) Applying to a substrate a composition comprising:
  (1) about 90 to 10 parts by weight of an epoxy containing vinyl chloride terpolymer selected from the group consisting of vinyl chloride/ vinyl acetate/glycidyl acrylate terpolymer containing at least 50% by weight of vinyl chloride, 5 to 15% by weight of vinyl acetate and 5 to 15% by weight of glycidyl acrylate, copolymerized therein an da vinyl chloride/vinyl acetate/glycidyl methacrylate terpolymer containing at least 50% by weight of vinyl chloride, 5 to 15% by weight of vinyl acetate and 5 to 15% by weight of glycidyl methacrylate copolymerized therein,
  (2) about 10 to 90 parts by weight of a vinyl chloride terpolymer selected from the group consisting of terpolymers containing at least 50% by weight of vinyl chloride, 5 to 15% by weight of vinyl acetate and 5 to 10% by weight of vinyl alcohol copolymerized therein, terpolymers containing at least 50% by weight of vinyl chloride, 5 to 20% by weight of vinyl acetate and 1 to 5% by weight of acrylic acid copolymerized therein, terpolymers containing at least 50% by weight of vinyl chloride, 5 to 20% by weight of vinyl acetate and 1 to 5% by weight of methacrylic acid copolymerized therein, and terpolymers containing at least 50% by weight of vinyl chloride, 5 to 20% by weight of vinyl acetate and 1 to 5% by weight of maleic acid copolymerized therein; and
  (3) from about 0.1 to 3.0% of a catalytic curing agent based on the total polymer weight; and
 (b) heating the coated substrates for about 1 to 30 minutes at a temperature of about 250° F. to 500° F.

12. Method claimed in claim 11 wherein the substrate is a metal.

13. Method claimed in claim 12 wherein the coated substrate is heated for about 10 to 20 minutes at a temperature of about 300° F. to 400° F.

14. Method claimed in claim 11 wherein the substrate is a cellulosic material.

15. A shaped metallic article coated with the cured coating composition claimed in claim 1.

References Cited

UNITED STATES PATENTS

| | | | |
|---|---|---|---|
| 3,100,758 | 8/1963 | Ravve | 260—836 |
| 3,105,826 | 10/1963 | Barre | 260—836 |
| 3,170,963 | 2/1965 | Ravve | 260—836 |
| 3,291,857 | 12/1966 | Howerton | 260—836 |
| 3,301,919 | 1/1967 | Cenci | 260—836 |
| 3,317,635 | 5/1967 | Osmond | 260—836 |

MURRAY TILLMAN, Primary Examiner

PAUL LIEBERMAN, Assistant Examiner

U.S. Cl. X.R.

117—161, 132, 145; 260—31.2, 32.4, 32.8, 33.2, 33.6, 33.8, 45.75, 78.5, 80.72, 80.75, 80.80